Nov. 3, 1931.  D. E. PRENVEILLE  1,830,407
VALVE
Filed Jan. 5, 1927
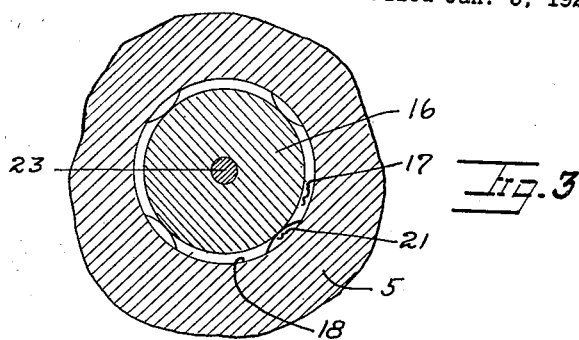
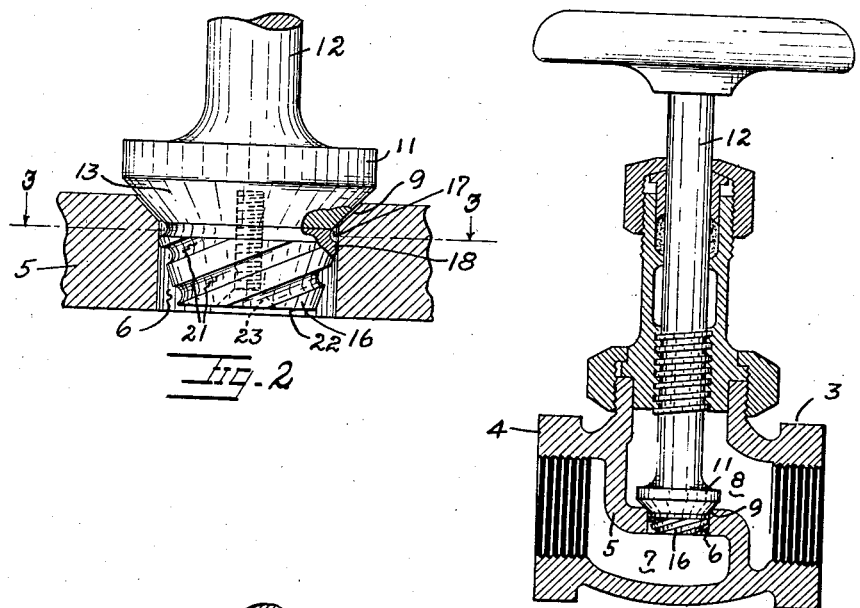
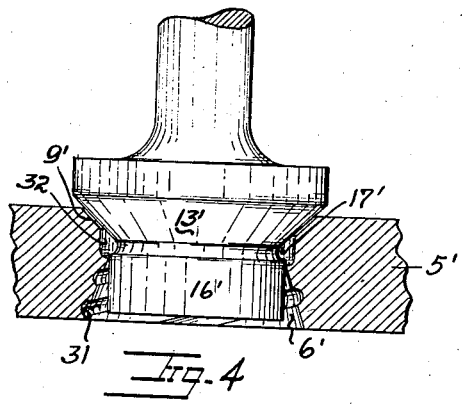
INVENTOR.
DONALD E. PRENVEILLE
BY Joseph B. Gardner
ATTORNEY.

Patented Nov. 3, 1931

1,830,407

UNITED STATES PATENT OFFICE

DONALD E. PRENVEILLE, OF OAKLAND, CALIFORNIA, ASSIGNOR OF ONE-HALF TO ANTOINE E. M. PRENVEILLE, OF OAKLAND, CALIFORNIA

VALVE

Application filed January 5, 1927. Serial No. 159,078.

My invention relates to high pressure stop valve, and particularly to a means for preventing the cutting of the opposed seat and plug surfaces of such valve on account of the wire-drawing effect of the fluid passing through the passage defined between said surfaces, particularly when the valve is but slightly open.

An object of the invention is to provide in a stop valve structure means operative to so direct the fluid through the passage between the plug and seat that it will progress spirally through such passage, and it is a further object of my invention to provide particularly simple means of the character described which may be included in the plug structure of a valve without affecting the design of the valve.

The invention possesses other objects and features of advantage, some of which, with the foregoing, will be set forth in the following description of the preferred form of my invention which is illustrated in the drawings accompanying and forming part of the specification. It is to be understood, however, that I do not limit myself to the showing made by the said drawings and description, as I may adopt variations of the preferred form within the scope of my invention as set forth in the claims.

Referring to said drawings,

Figure 1 is a side sectional view of a plug valve embodying my invention.

Figure 2 is an enlarged fragmentary view of a portion of the structure shown in Figure 1, the valve being very slightly opened.

Figure 3 is a view taken on the line 3—3 in Figure 2.

Figure 4 is a fragmentary view similar to that of Figure 2 of another embodiment of the invention.

As is well known, fluids, and particularly steam, when allowed to escape at a high pressure through a partly open plug valve, tend to score, or wire-draw, the plug and seat surfaces of the valve and thus soon render the valve inoperative for effecting a complete closure of a fluid passage, whereby the useful life of such valve is very much shortened. This difficulty is particularly met with in stop valves, which types of valves being intended to be only fully opened or fully closed, are usually of an extremely simple structure which does not permit their use as a throttle valve. But in the manipulation of such a valve, there is always an instant when a very small flow of the fluid is permitted therethrough, particularly as the valve is opened, and the instantaneous flow through the valve thus permitted tends to effect the scoring of the plug and seat surfaces, even though the operator manipulates the valve as quickly as possible. Furthermore, a throttle use of a stop valve may occasionally be desirable, and yet such use be not frequent enough to warrant the installation of a more expensive throttle valve in its stead. It is, accordingly, a particular object of my invention to produce an improved stop valve which will have an increased useful life under given working conditions by providing it with means for minimizing the wire-drawing effect referred to.

As herewith particularly illustrated, the device of my invention is structurally associated with a plug valve 3 of a usual structure having a body portion 4 providing a fluid passage therethrough across which is interposed a partition 5 perforated to provide a cylindrical connecting passage 6 between the inlet and outlet passage portions 7 and 8 respectively defined at the opposite sides of the partition 5. A generally annular valve-plug seat 9 is preferably provided at the outlet end of the passage 6, which seat is arranged to have a valve plug 11 seated thereagainst to effect a closure of the passage. As here shown, the plug 11 is mounted on a valve stem 12, which stem is arranged to be projected longitudinally in the axial line of the seat 9; as particularly disclosed herewith, the seat portion 13 of the plug is frustro-conical in outline to provide a seat for engagement with the seat 9 which is correspondingly shaped.

It will be noted that the structure now described is a usual one for plug valves, and that an annular path for the fluid is defined between the surfaces of the body and plug seats 9 and 13 respectively when the valve is open. And it will be further noted that with the valve open, the fluid from the passage 6 will normally tend to move between the seats 9 and 13 along straight lines paralleling the surface of their cone. Assuming, now, that the plug is unseated only very slightly, the fluid escaping between the seats would tend to concentrate along the particular taper line of the seat cone where the fluid path is of greatest radial thickness, which concentration would tend to deflect the plug out of its axial alignment with the seat 9 and diametrically away from such taper line. In this manner, a concentrated flow of substantially all of the fluid over particular seat portions results whereby the before mentioned wire-cutting follows. It will now be clear that if a uniformly distributed flow of the fluid between and along the seats could be effected, such concentration of fluid flow and the resulting cutting thereby would be prevented, and means are accordingly provided for effecting the desirable distributed flow, such means being here shown carried on the valve plug.

Mounted on the valve plug to extend longitudinally therefrom is a member 16, which member is preferably of generally frustro-conical shape with the larger base portion thereof disposed adjacent the plug seat 13 and slidably engageable with the sides of the passage 6. The member 16, it will be noted, extends substantially to the plane of the inner edge of the seat 13 and is annularly constricted adjacent such seat edge whereby an annular groove 17 is defined by and between the plug seat 13 and the portion 18 of the member 16 which is arranged to slidably engage the bore of the passage 6. Formed in the conical surface of the member 16 is a series of spirally directed grooves 21, which grooves terminate respectively in the groove 17 and adjacent the outer end surface 22 of the member 16. As here shown, the member 16 is removably secured to the valve plug 11 by means of a screw 23, and therefore constitutes an attachment for such plug, but it will, of course, be obvious that the plug and member might be formed as an integral structure without departing from the spirit of the invention.

It will be noted that when the valve having the member 16 provided thereon is opened an amount which would ordinarily cause a wire-drawing of its seat surfaces, the only fluid which may escape between the seats is that from the slot 17, and that as such fluid escapes, the fluid which replaces it will be directed by and delivered through the grooves 21 into the slot 17 in a generally tangential relation thereto whereby a circumferential motion will be imparted to the fluid in such slot, which motion will effect a delivery of fluid from the slot spirally around the seat surfaces. The spirally progressive passage of the fluid between the seats, it will be noted, acts to maintain the plug-valve seat 13 in centered relation to the seat 9, with the result that the fluid is distributed in a film or layer of equal thickness over the various valve surface portions and does not become concentrated to pass in a straight line over limited seat portions, as would tend to be the case without the use of the member 16 in the valve structure. Furthermore, the increased contact area provided between the valve seats and fluid tends to cut down the speed of movement of the fluid over the seat surfaces, which further minimizes the danger of wire-drawing such surfaces. It will thus be clear that the device of my invention provides a high degree of protection for stop valves used under high pressure conditions to appreciably lengthen their useful life, and actually makes possible the use of such valves as throttle valves. And it will, of course, be obvious that the device may be applied to valves of other structure than that herein specifically shown to function in the manner indicated.

It will now be noted that the groove for directing the fluid spirally into the groove 17 may, if desired, be provided in the walls of the passage 6 rather than on the member 16, such structure being disclosed in Figure 4. As particularly shown in such embodiment, the passage 6' is of frustro conical outline while the member 16' is cylindrical and is provided with an annular groove 17' at its juncture with the plug seat portion 13', as in the other embodiment. Formed in the wall of the passage 6' are spirally directed grooves 31 which terminate in an annular groove 32 in the wall 5' adjacent the valve seat 9', such latter groove extending cylindrically to an intersection with the seat 9' and being arranged to be disposed opposite the groove 17' when the valve is but slightly open to cooperate therewith in effecting the desired spirally directed delivering of fluid along the seats. In this manner, the desired spiral delivery of fluid over the seats is again arranged to be obtained in an extremely simple manner.

I claim:

1. In a valve of the character described, an annular valve seat, a valve plug arranged to be engaged with said seat, and means acting only when operative below the plane of said seat, and when said valve is open to cause the fluid to progress spirally over said seat, said means being inoperative when the plug is moved into a predetermined open position.

2. In a valve of the character described, an annular valve seat, a valve plug arranged to be engaged with said seat, and means carried by said valve plug and which acts only when disposed below the plane of said seat and when said plug is spaced from said seat to direct the fluid spirally over said seat, said means disposed clear of the path of fluid flowing through said seat and thereby rendered inoperative when the plug is moved into a predetermined open position.

3. In a valve of the character described, a body portion providing a fluid passage, a valve seat about said passage, a valve plug arranged to be engaged with said seat to close said passage, a conically tapered member carried by said valve plug and slidably engageable in said passage, means cooperative between the wall of said passage and said member when said plug is spaced from said seat to effect a spiral movement of fluid through said passage, and means for moving said plug to dispose the conically tapered member in a position where it and said last named means are inoperative to effect a spiral movement of fluid through said passage.

4. In a valve of the character described, a body portion providing a fluid passage, a valve seat about said passage, a valve plug arranged to be engaged with said seat to close said passage, a member carried by said valve plug and slidably engageable in said passage, said plug and member defining a groove, said plug having spirally directed grooves therein in normal registration with said first groove and with said passage at the free end of said member, said member being arranged for disposal entirely out of said passage when said valve is fully open.

In testimony whereof, I have hereunto set my hand at Oakland, California, this 24th day of December, 1926.

DONALD E. PRENVEILLE.